Figure 1:
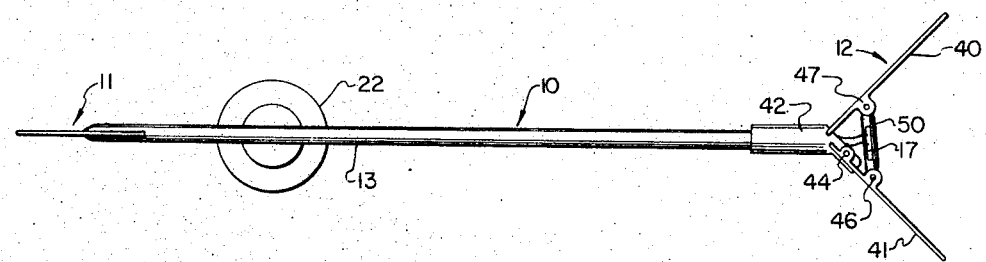

Sept. 26, 1967 A. B. STOUT, JR 3,343,412
HORIZONTAL WIND DETECTOR
Filed Sept. 17, 1964

INVENTOR.
ALLISON B. STOUT JR.
BY *Mallinckrodt and Mallinckrodt*
ATTORNEYS

United States Patent Office 3,343,412
Patented Sept. 26, 1967

3,343,412
HORIZONTAL WIND DETECTOR
Allison B. Stout, Jr., Salt Lake County, Utah, assignor to Kennecott Copper Corporation, New York, N.Y., a corporation of New York
Filed Sept. 17, 1964, Ser. No. 397,214
5 Claims. (Cl. 73—189)

This invention relates generally to meteorological instruments for continually detecting horizontal wind forces and their magnitudes.

In the making of meteorological studies it is imperative that accurate wind data be obtained. It is not only necessary to be able at all times to determine prevailing wind direction and velocity, but to be able, also, to determine the frequency and duration of turbulence-creating gusts. These gusts may be from the prevailing wind direction or may constitute crosswinds, but, in either case, it is believed that they have an important effect on atmospheric conditions.

A principal object of the present invention is to provide simple apparatus for continuously indicating prevailing wind direction and magnitude, while, at the same time, indicating the frequency and duration of wind gusts.

It is a further object to make such apparatus sufficiently sensitive to be capable of measuring very low magnitude winds and of detecting gusts having a duration as short as one millisecond, yet sufficiently sturdy to withstand the elements and to give long and satisfactory operation without being attended.

To accomplish the aforesaid objects, I provide an elongate, freely-rotatable, wind indicator having a pair of tail vanes, at least one of which is movable relative to the other. A strain gauge is positioned between such vanes so as to be actuated in accordance with the degree of wind force tending to move them together. Measurements so taken are recorded by means of a substantially friction-free electrical system.

Since the amount of relative movement of the tail vanes is determined by the force of the wind acting thereon, and since this force is directly related to wind velocity, the signals produced by the strain gauge changes are actually indicative of wind velocity. By amplifying the signals and continuously marking them on a recorder, and by comparing the recorded signals with similar marks made for winds of known velocity value, it is possible not only to determine the presence of prevailing winds and the presence and duration of gusts, but to also determine their velocity with a reasonable degree of accuracy.

The wind indicator will at all times be pointing into the wind, so prevailing wind direction can be easily observed. If desired, a potentiometer such as that disclosed in my United States application for patent, Serial No. 354,970, filed March 26, 1964, now Patent No. 3,286,521 can be used to provide a continuous electrical signal indicative of wind direction and suitable for operating a recorder marker.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

Figure 2:
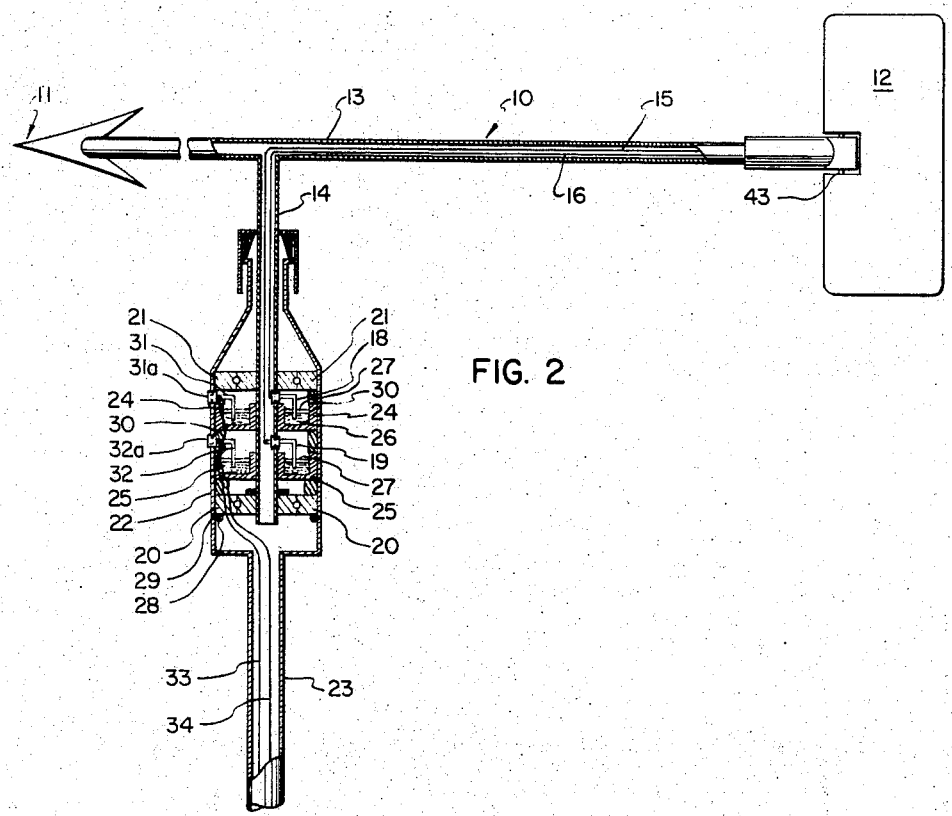

In the drawing:

FIG. 1 is a top plan view of a wind indicator embodying the invention;

FIG. 2, a fragmentary side elevation partially cut-away, and

Figure 3:
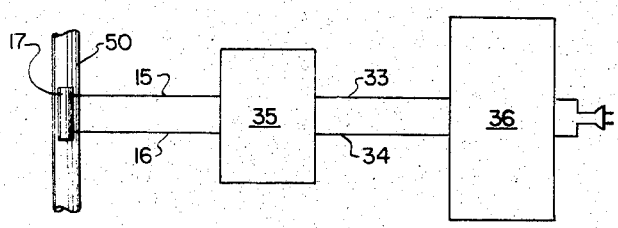

FIG. 3, a schematic showing of a preferred wind-recorder control circuit for the indicator.

Referring now to the drawing:

In the illustrated preferred embodiment a wind indicator, shown generally at 10, serves to indicate wind direction and duration. The wind indicator has the usual weight 11 at one end counterbalancing a tail 12 at the other end of an elongate rotating rod 13, so that the weighted end of rod 13 will at all times point into the wind.

Rod 13 is tubular and the bore thereof intersects the bore of a tubular support shaft 14 such that a pair of electrical wires 15 and 16 can be passed from a conventional strain gauge 17, through shaft 14 and rod 13.

The other ends of wires 15 and 16 are respectively electrically connected to contacts 18 and 19 which extend through, and are rotatable with shaft 14.

Support shaft 14 rests on and is journaled by bearings 20 and 21 within a support housing 22, and the support housing is maintained at desired height on a securely mounted upright post 23 that is firmly planted in the ground, or on a building, vehicle, etc.

Ring shaped cups 24 and 25 are positioned within housing 22 and surround shaft 14. These serve as reservoirs for mercury 26 having a layer of silicone oil 27 thereon. Because of its inert characteristics, the cups are preferably formed of an acrylic plastic.

Bearing 20 rests on a snap ring 28 positioned in groove 29 formed within housing 14, and sleeve-like spacers 30 hold cups 24 and 25, and bearing 21, in spaced relationship thereabove.

Shaft 14 rotates freely within the cups and contacts 18 and 19 carried thereby extend downwardly into engagement with the mercury in cups 24 and 25, respectively.

Similarly, contacts 31 and 32, supported within grommets 31a and 32a that pass through the wall of housing 22, extend into the mercury in cups 24 and 25, respectively. Contacts 31 and 32 are positioned so that contacts 18 and 19 can freely revolve with shaft 14.

Wires 33 and 34 are connected to contacts 31 and 32, respectively, and to combined electrical measuring and amplifying means 35 of standard construction, e.g. a standard bridge circuit and an amplifier for the electrical signals generated in the circuit, and recorder 36. These wires complete a circuit including the recorder, the amplifier, and the strain gauge, through the contacts 31 and 32, the mercury in cups 24 and 25, and contacts 18 and 19.

Tail 12 of wind indicator 10 includes a fixed vane 40 and pivotally mounted vane 41 diverging outwardly from a connector 42 fixed to the end of rod 13. Pin 43 extending through matching ears 44 and 45 on connector 42 and vane 40, respectively, provides a pivot connection about which the vane can be rotated, and vane 40 is fixed to connector 42 by welding, or the like.

Strain gauge 17 is bonded or otherwise suitably affixed to a rod 50 that is pivotally connected to vanes 40 and 41 by means of pivot pins 46 extending through the ends of the rod, and through matching ears 47 on the vanes. Compression or elongation of the rod results in a corresponding change in strain gauge resistance, and this resistance change varies an electrical signal whose magnitude is increased by the amplifying part of the combined measuring and amplifying means 35 before it is recorded on continuous recorder 36. Rod 50 must be constructed of a material capable of limited deformation, and with good memory characteristics tending to return it to its original shape. A styrene plastic tube has been found satisfactory for the purpose, although it should be apparent that other materials can also be used, and that the sensitivity and range of detection will be somewhat dependent upon the material employed.

The strain gauge, amplifier, and recorder are all of standard construction and, per se, do not constitute any part of the present invention.

In operation, air movement rotates rod 13 until it extends parallel to the direction of air movement, with the weighted end pointed in the direction from which the wind is approaching and the tail down-wind.

The wind strikes the outwardly diverging vanes and forces movable vane 41 toward fixed vane 40, somewhat compressing the strain gauge 17. The amount of compression determines the resistance of the strain gauge, and a corresponding mark is made on the recorder. Gusts of wind, either from the prevailing wind direction, or constituting cross winds, also impinge on the vanes to compress the strain gauge, often for only very short periods of time. These gusts are indicated on the recorder as sharp deviations from the steadier prevailing wind marks. Thus, with the present invention, it is possible to determine prevailing wind magnitude as well as frequency and magnitude of gusts having even small velocity and brief duration. In addition, the prevailing wind direction can be easily observed.

The mercury filled cups 24 and 25, and fixed and movable contacts extending into the mercury, provide an electrical connector assembly in which substantially no friction is developed between relatively moving parts. This is highly important where, as here, the signal transmitted may be varied only slightly due to very minute wind forces, and where any frictional engagement may disturb the signal enough to make it unusable.

Whereas there is here illustrated and specifically described a certain preferred construction of apparatus which is presently regarded as the best mode of carrying out the invention, it should be understood that various changes may be made and other construction adopted without departing from the inventive subject matter particularly pointed out and claimed herebelow.

I claim:

1. A horizontal wind detector, comprising a wind direction indicator including an elongate freely rotatable member weighted at one end and supported for rotation, so as to assume positions indicative of wind direction; a pair of tail vanes at the other end of the rotatable member; means mounting at least one of said tail vanes for pivotal movement with respect to said rotatable member; means for resiliently restraining said pivotal movement; and sensing means positioned between said tail vanes to detect relative movement therebetween occurring in response to wind conditions.

2. A horizontal wind detector according to claim 1, wherein the sensing means includes a strain gauge.

3. A horizontal wind detector, comprising a wind direction indicator including an elongate freely rotatable member weighted at one end and supported for rotation, so as to assume positions indicative of wind direction; a pair of tail vanes at the other end of the rotatable member; means mounting at least one of said vanes for pivotal movement with respect to said rotatable member; means rigidly mounting the other of said vanes such that said vanes diverge outwardly away from the rotatable member; a rod interconnecting said vanes; a strain gauge mounted on said rod; a recorder; and circuit means interconnecting said strain gauge and the recorder whereby changes in length of said rod occurring in response to wind conditions are indicated on said recorder.

4. A horizontal wind indicator according to claim 3, wherein the circuit means is electrical and includes electrical signal measuring and amplifying means connected between the strain gauge and the recorder.

5. A horizontal wind indicator according to claim 3, wherein the circuit means is electrical and further includes a cup; electrically conductive liquid in said cup; electrical contacts interconnecting the strain gauge and said conductive liquid, said electrical contacts being rotatable with said wind indicator; and electrical circuit means interconnecting said conductive liquid and the recorder.

References Cited

UNITED STATES PATENTS

| | | | |
|---|---|---|---|
| 764,759 | 7/1904 | Owen | 73—189 |
| 1,564,877 | 12/1925 | Marcellus | 310—178 X |
| 1,667,660 | 4/1928 | Gehm | 339—8 |
| 2,270,120 | 1/1942 | Greene | 73—189 |
| 2,699,679 | 1/1955 | Munger | 73—170 |
| 3,094,869 | 6/1963 | Wehmann | 73—189 |
| 3,217,536 | 11/1965 | Motsinger et al. | 73—189 |

JAMES J. GILL, *Acting Primary Examiner.*

RICHARD C. QUEISSER, *Examiner.*

J. JOSEPH SMITH, CHARLES A. RUEHL,
*Assistant Examiners.*